(12) United States Patent
Ridel et al.

(10) Patent No.: US 8,837,564 B2
(45) Date of Patent: Sep. 16, 2014

(54) MULTI GIGABIT MODEM FOR MMWAVE POINT TO POINT LINKS

(75) Inventors: Eran Ridel, Rosh Ha'aiyn (IL); Ran Soffer, Tel-Mond (IL)

(73) Assignee: Broadcom Corporation, Irvine, CA (US)

(*) Notice: Subject to any disclaimer, the term of this patent is extended or adjusted under 35 U.S.C. 154(b) by 120 days.

(21) Appl. No.: 13/341,690

(22) Filed: Dec. 30, 2011

(65) Prior Publication Data
US 2013/0094549 A1   Apr. 18, 2013

Related U.S. Application Data

(60) Provisional application No. 61/547,359, filed on Oct. 14, 2011.

(51) Int. Cl.
H04B 1/38 (2006.01)
H04L 27/00 (2006.01)
H04W 88/08 (2009.01)

(52) U.S. Cl.
CPC .................. H04L 27/00 (2013.01); H04W 88/085 (2013.01)
USPC ........... 375/222; 375/219; 375/220; 375/295; 375/316

(58) Field of Classification Search
USPC .......................... 375/222, 219, 220, 295, 316
See application file for complete search history.

(56) References Cited

U.S. PATENT DOCUMENTS

| | | | |
|---|---|---|---|
| 6,330,278 B1* | 12/2001 | Masters et al. | 375/223 |
| 7,990,298 B1 | 8/2011 | Friedmann et al. | |
| 2003/0050028 A1* | 3/2003 | Pasternak | 455/259 |
| 2004/0120418 A1* | 6/2004 | Pasternak et al. | 375/272 |
| 2007/0153726 A1* | 7/2007 | Bar-Sade et al. | 370/329 |
| 2008/0181282 A1* | 7/2008 | Wala et al. | 375/130 |
| 2010/0087227 A1* | 4/2010 | Francos et al. | 455/562.1 |
| 2011/0053536 A1* | 3/2011 | Friedmann | 455/207 |
| 2011/0122932 A1* | 5/2011 | Lovberg et al. | 375/219 |
| 2013/0094438 A1* | 4/2013 | Ridel et al. | 370/328 |

FOREIGN PATENT DOCUMENTS

| | | |
|---|---|---|
| EP | 1 883 171 A2 | 1/2008 |
| EP | 1 981 202 A2 | 10/2008 |
| EP | 2 299 775 A1 | 3/2011 |

OTHER PUBLICATIONS

"Common Public Radio Interface (CPRI); Interface Specification V5.0," accessed via the Internet on Jun. 27, 2013 at http://www.cpri.info/downloads/CPRI_v_5_0_2011-09-21.pdf, Sep. 21, 2011 (119 pages).

(Continued)

*Primary Examiner* — Kenneth Lam
(74) *Attorney, Agent, or Firm* — Sterne, Kessler, Goldstein & Fox, P.L.L.C.

(57) ABSTRACT

A millimeter wave modem assembly, which includes an input/output interface module configured to receive and transmit standardized data streams in accordance with dedicated interface specifications, and includes an encoder module configured to encode the standardized data streams to form coded digital bits, and also includes a physical layer module configured to convert the coded digital bits into digital symbols and into digital samples, and to convert the digital samples into the digital symbols and then into the coded digital bits; and further includes a data conversion module configured to perform a high rate conversion of the digital samples to form an analog signal suitable for wireless transmission over a link in accordance with the dedicated interface specifications.

26 Claims, 7 Drawing Sheets

(56) References Cited

OTHER PUBLICATIONS

Ericsson, "Mini-Link TM TN R4, ETSI," accessed via the Internet on Jun. 27, 2013 at http://archive.ericsson.net/service/internet/picov/get?DocNo=1/28701-EN/LZT1105195, Dec. 31, 2010 (4 pages).

Wells, Jonathan, "Faster than Fiber: The Future of Multi-Gb/s Wireless," in *IEEE Microwave Magazine* 10(3): pp. 104-112, May 2009 (9 pages).

European Search Report for EP Application No. 12 00 7025, European Patent Office, Munich, Germany, mailed on May 13, 2013 (8 pages).

Communication from the Examining Division of the European Patent Office, directed to related European Patent Application No. 12 007 025.5, mailed Mar. 14, 2014, Munich. Germany; 10 pages.

Dyadyuk, et al., "Multi-Gigabit Wireless Communication Technology in the E-Band," Wireless VITAE, IEEE, May 17. 2009; 5 pages.

"Open Radio equipment Interface (ORI); Requirements for Open Radio equipment Interface (ORI) (Release 1)," ETSI GW ORI 001 V.1.1.1, Oct. 2011; 11 pages.

\* cited by examiner

MULTI GIGABIT MODEM FOR MMWAVE POINT TO POINT LINKS

CROSS REFERENCE TO RELATED APPLICATIONS

This patent application claims the benefit of U.S. Provisional Patent Application No. 61/547,359, filed Oct. 14, 2011, which is incorporated herein by reference in its entirety.

BACKGROUND OF THE INVENTION

1. Field of the Invention

The invention relates to millimeter wave point to point communications, and more specifically to a modem assembly that is capable of performing high rate digital-to-analog conversions and high rate analog-to-digital conversions such that an analog signal can be transmitted over a wireless link.

2. Related Art

A radio access network (RAN) is a known component of various types of communication systems. Commonly, the RAN concept refers to an interface between a communication device and its core network (CN). Recently, several concepts have been introduced in an effort to reduce capital expenditures and operating cost associated with implementing and maintaining communication systems employing RAN.

One such concept has been commonly referred to as the Cloud RAN concept. In conventional network architecture, each antenna connects to a co-located eNodeB from which traffic is backhauled to the Evolved Packet Core (EPC) over an Internet Protocol (IP) link. However, the Cloud RAN concept replaces the eNodeB at the antenna with a low-cost Remote Radio Head (RRH). This allows digitized RF data to be communicated over a dedicated interface specification, such as common public radio interface (CPRI) to provide an example, to a centralized processing device, where baseband processing can then be performed.

However, due to the high bit rate requirements associated with the CPRI standard, communication between a base station and the RRHs is carried out using a fiber optic cable. The fiber optic cable is connected directly between the base station and the RHH to allow for control of strict timing requirements necessitated by the standards governing communication on a link, such as the CPRI standard to provide an example. However, deployment of a fiber optic cable in certain areas, such as densely populated areas and areas having unusual terrain, may not be possible or would be prohibitively expensive. For example, fiber optic deployment in such areas could require digging up the ground and/or moving structures built in those areas, all of which would result in very high costs and expenses. Additionally, for these reasons as well as others, fiber optic deployment takes a relatively long time to complete. Thus, there is a need for an alternative to deploying fiber optic cable, which still meets the governing standards for communication over a fiber optic link. Further aspects and advantages of the invention will become apparent from the detailed description that follows.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 1:
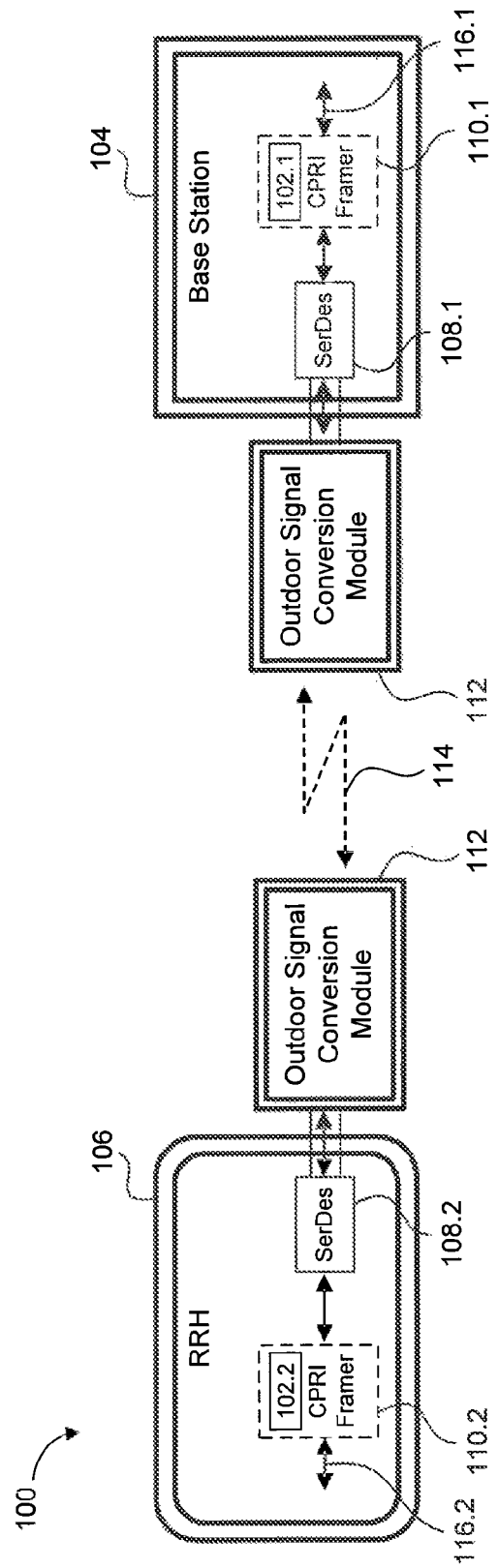
FIG. 1 illustrates a block diagram of a wireless communication environment according to an exemplary embodiment.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number

DETAILED DESCRIPTION OF THE INVENTION

The following Detailed Description refers to accompanying drawings to illustrate exemplary embodiments consistent with the invention, References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present invention is to be described in terms of wireless communication, those skilled in the relevant art(s) will recognize that the present invention may be applicable to other communications that use wired or other types of wireless communication without departing from the spirit and scope of the present invention.

An Exemplary Wireless Communication Environment

FIG. 1 illustrates a block diagram of a wireless communication environment according to an exemplary embodiment.

A wireless communication environment 100 provides for wireless communication of information, such as one or more commands and/or data, between a first wireless communication device 104 and a second wireless communication device 106. The first wireless communication device 104 may represent an exemplary embodiment of a base station module and the second wireless communication device 106 may represent an exemplary embodiment of a remote radio head (RRH) module.

The RRH module 106 may be connected to the base station module 104 over dedicated interface specifications such as common public radio interface (CPRI) or open base station architecture initiative (OBSAI) to provide some examples. Although the majority of the present disclosure refers to the CPRI specification when discussing the standard governing communication over a link, this is for illustrative purposes only. Those skilled in the relevant art(s), will recognize that other standards, such as OBSAI, European Telecommunications Standards Institute (ETSI), open radio interface (ORI), or Federal Communications Commission (FCC), to provide some examples, may be used to govern communication over the link.

The wireless connection between the RRH module 106 and the base station module 104 requires very high bit rates, which may vary between approximately 0.6 gigabits per second (Gbps) and approximately 9 Gbps. Conventionally, the CPRI specifications are designed to govern communications over fiber optic cables. However, the wireless communication environment 100 communicates over a wireless CPRI (wCPRI) link 114, in accordance with the CPRI specifications.

In the wireless communication environment 100, the base station module 104 and the RRH module 106 may each include a serial/deserializer (SerDes) module 108.1 and 108.2, respectively. Also, the base station module 104 may include a standardized framer module 110.1 coupled to the SerDes module 108.1, and the RRH module 106 may include a standardized framer module 110.2 coupled to the SerDes module 108.2. Although the present disclosure refers to standardized framer modules 110.1 and 110.2 when discussing the framer modules used within the communication environment 100, this is not mean to limit the disclosure in any way. Those skilled in the relevant art(s), will recognize that the standardized framer modules 110.1 and 110.2 refer to framer modules that operate according to the standards that govern communication over a link, such as CPRI to provide an example.

Each of the SerDes modules 108.1 and 108.2 convert digital data signals 116.1 and 116.2, respectively, between serial data and parallel interfaces in both communication directions. The framer module 110.1 flames the incoming digital data signal 116.1 with management data in accordance with a high-level clock signal 102.1 to form a collection of standardized digital bits according to the CPRI specifications. The high-level clock signal 102.1 is generated by the framer module 110.1, and it allows the framer module 110.1 to identify data packets within the digital data signal 116.1. Therefore, the high-level clock signal 102.1 allows the framer module 110.1 to frame the digital data signal 116.1 according to the CPRI standard. In an exemplary embodiment, the framer module 110.2 may function substantially similar to the framer module 110.1, as discussed above. Thus, the framer module 110.2 may generate a high-level clock signal 102.2 that allows the framer module 110.2 to frame the digital data signal 116.2 according to the CPRI standard.

The wireless communication environment 100 may also include a pair of outdoor signal conversion modules 112, one if which is connected to the base station module 104 and another one is connected to the RRH module 106. The outdoor signal conversion modules 112 provide wireless communication between the base station module 104 and the RRH module 106 over the wCPRI link 114 while also meeting the high bit rate requirements defined by the CPRI specifications. Therefore, neither the base station module 104 nor the RRH module 106, according to this exemplary embodiment, would be able to distinguish whether a transmission occurred over the wCPRI link 114 or over a conventional fiber optic cable.

Given this ability of the base station module 104 and RRH module 106 to communicate over the wCPRI link 114, the deployment of the RRH modules 106 is rendered quick and easy. In particular, RRH deployment in this embodiment of the invention is very similar to standard point to point (PtP) link deployment. Additionally, RRH modules 106 may be deployed throughout dense urban areas without incurring substantial costs and expenses. Further, as will be discussed in greater detail later in this disclosure, the RRH modules 106 may be deployed at greater distances then were previously possible with the fiber optic cables. Typically, the wCPRI link 114 can support a link range of up to approximately 2.5 kilometers between the base station module 104 and the RRH module 106; however, other link ranges are possible without departing from the spirit and scope of the present disclosure.

An Exemplary Outdoor Signal Conversion Module

Figure 2:
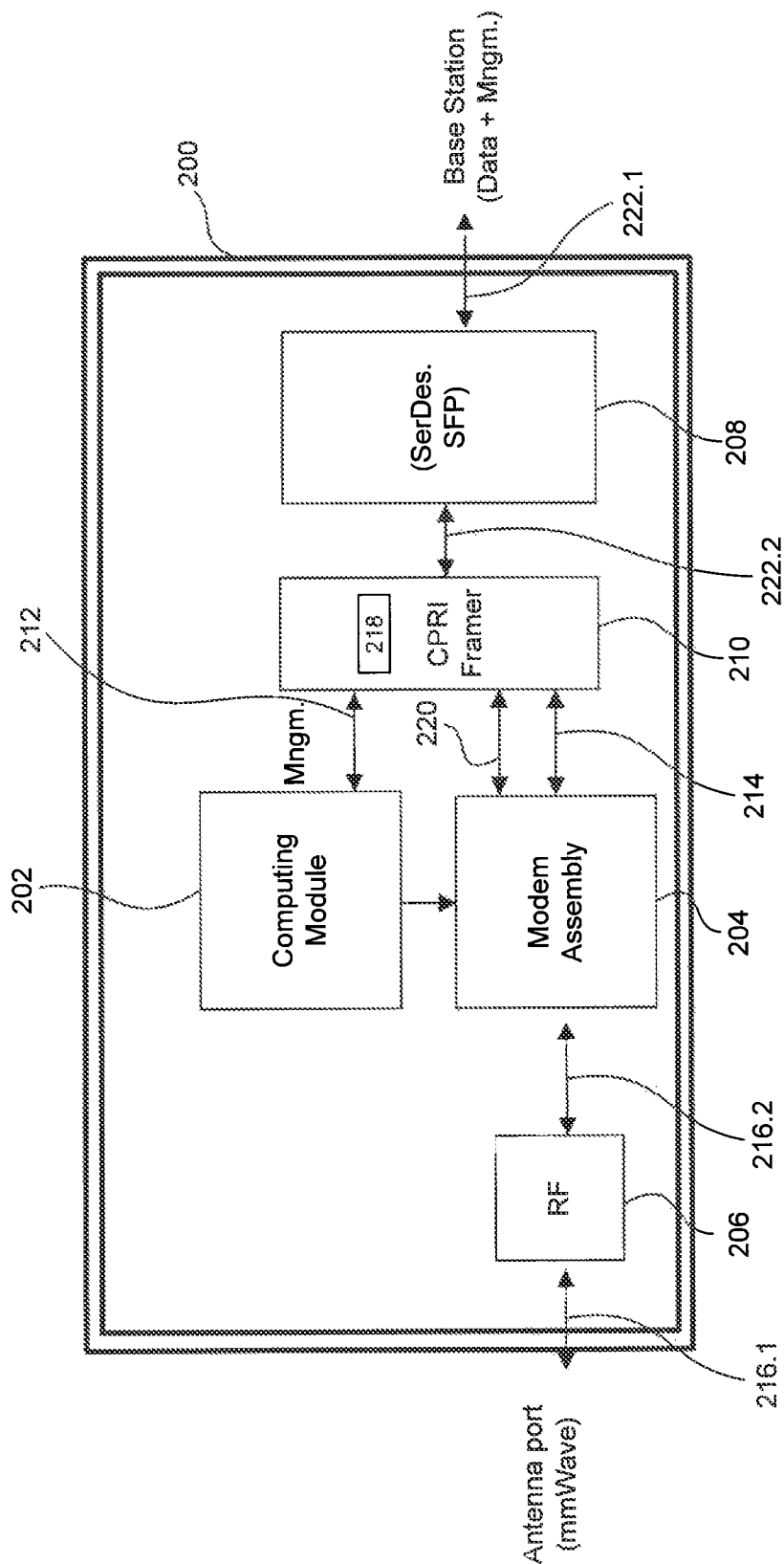
FIG. 2 illustrates a block diagram of an outdoor signal conversion module that is implemented as part of the wireless communication environment according to an exemplary embodiment.

FIG. 2 illustrates a block diagram of an outdoor signal conversion module that is implemented as part of the wireless communication environment according to an exemplary embodiment. An outdoor signal conversion module 200 may represent an exemplary embodiment of the outdoor signal conversion modules 112.

The outdoor signal conversion module 200 includes a computing module 202 that performs various computations on management data 212. The signal conversion module 200 also includes a modem assembly 204 coupled to the computing module 202. The modem assembly 204 may perform a high rate digital-to-analog conversion (DAC) of incoming standardized digital samples 214 to form an analog sequence 216.2. Alternatively, in an exemplary embodiment, the modem assembly 204 may perform a high rate analog-to-digital conversion (ADC) of the analog sequence 216.2 to form the standardized digital samples 214. Further, in an exemplary embodiment, the modem assembly 204 may perform both the high rate DAC of the standardized digital samples 214 to form the analog sequence 216.2, and the high rate ADC of the analog sequence 216.2 to form the standardized digital samples 214. The signal conversion module 200 further includes an RF functional module 206 coupled to the modem assembly 204, which performs operations upon the analog sequence 216.2. In an exemplary embodiment, the RF functional module 206 may perform either an up-conversion of the analog sequence 216.2 such that the analog signal 216.1 is suitable for transmission over the wCPRI link 114, or a down-conversion of the analog signal 216.1 such that the modem assembly 204 can perform the high rate ADC of the analog sequence 216.2.

The signal conversion module 200 may also include a serial/deserializer (SerDes) module 208 and a standardized framer module 210. The SerDes module 208 may represent an exemplary embodiment of the SerDes module 108.1, and the framer module 210 may represent an exemplary embodiment of the framer module 110.1. The SerDes module 208 converts an incoming digital data signal 222.1 between serial data and parallel interfaces in both communication directions. Additionally, the framer module 210 receives a digital data sequence 222.2 and frames the digital data sequence 222.2 with the management data 212 in accordance with a high-level clock signal 218 to form the standardized digital samples 214 according to the CPRI specifications. The high-level clock signal 218 may represent an exemplary embodiment of the high-level clock signal 102. Also, the high-level clock signal 218 is generated by the framer module 210, and it allows the framer module 210 to identify data packets within the digital data sequence 222.2. Therefore, the high-level clock signal 218 allows the framer module 210 to frame the digital data sequence 222.2 according the CPRI standard. Additionally, the signal conversion module 200 generates a second clock signal, a synchronous clock signal 220, which functions as an oscillator to synchronize the base station module 104 and the RRH module 106. The synchronous clock signal 220 is added by the framer module 210 prior to any operations being performed by the modem assembly 204. In an exemplary embodiment, the synchronous clock signal 220 may be transmitted via a dedicated port (not shown in FIG. 2). The synchronous clock signal 220 may also be based on a precision time protocol (PTP), defined in the IEEE 1588-2008 (1588v2) standard, or a Synchronous Ethernet (SyncE) protocol. However, any clock/networking protocol that is capable of synchronizing a transmitter and receiver over a wireless link may be used without departing from the spirit and scope of the present disclosure. The synchronous clock signal 220 is an integral feature of the invention due to the strict timing requirements defined by the CPRI standard.

The signal conversion module 200 performs a variety of functions on the incoming digital data signal 222.1 to allow the corresponding analog signal 216.1 to be transmitted and/or received over the wCPRI link 114. For illustrative purposes only, the functionality of the signal conversion module 200 will be discussed with reference to the signal conversion module's 200 preparation of the analog signal 216.1 for transmission over the wCPRI link 114. However, an analogous process can be performed such that the analog signal 216.1 can be received after its transmission over the wCRPI link 114, and 1 converted back into the digital data signal 222.1 that conform to the CPRI standard.

Accordingly, upon receipt of the digital data signal 222.1 at the base station module 104, the base station module 104 transmits the digital data signal 222.1 to the signal conversion module 200. The digital data signal 222.1 is then input into the SerDes module 208, which converts the digital data signal 222.1 between serial data and parallel interfaces to form the digital data sequence 222.2. In an exemplary embodiment, the SerDes module 208 may also include a small form factor pluggable transceiver (SFP) such that the SerDes module 208 can receive data over a wireless link or over a fiber optic link.

The digital data sequence 222.2 is input into the framer module 210, which then frames the digital data sequence 222.2. The framer module 210 also frames the digital data sequence 222.2 with the management data 212 in accordance with a high-level clock signal 218 to form the standardized digital samples 214 according to the CPRI specifications. In an exemplary embodiment, the framer module 210 outputs the management data 212 to the computing module 202, and outputs the resulting standardized digital samples 214 to the modem assembly 204.

In an exemplary embodiment, the SerDes module 208 and the framer module 210 may reside solely in the base station module 104. Therefore, in such an exemplary embodiment, the signal conversion module 200 does not include the SerDes module 208 or the framer module 210. Additionally, in such an exemplary embodiment, the computing module 202 receives the management data 212 directly from the base station module 104, and not from the framer module 210.

The computing module 202 performs various computations on the management data 212, and then outputs the management data 212 to the modem assembly 204. The functionality of the modem assembly 204 will be discussed in greater detail later in this disclosure. The analog sequence 216.2 is then input into the RF functional module 206 from the modem assembly 204. As discussed in greater detail above, the RF functional module 206 performs operations upon the analog sequence 216.2, such as up-conversion of the analog sequence 216.2, such that the analog signal 216.1 is suitable for transmission over the wCPRI link 114. The analog signal 216.1 is then sent to a millimeter wave antenna via an antenna port, which transmits the analog signal 216.1 over the wCPRI link 114.

An Exemplary Millimeter Wave Modem Assembly

Figure 3:
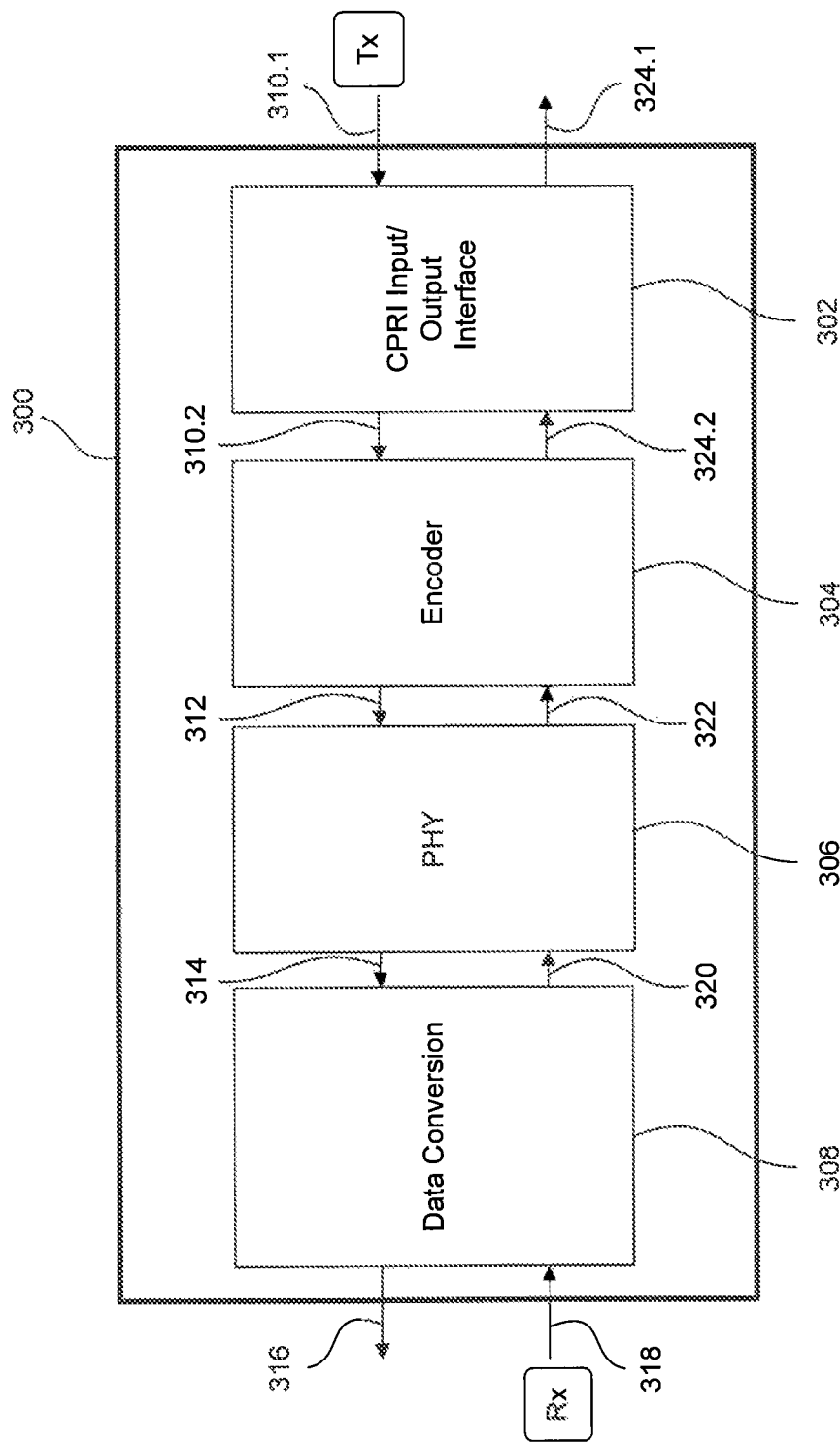
FIG. 3 illustrates a block diagram of a millimeter wave modem assembly that is implemented as part of the outdoor signal conversion module according to an exemplary embodiment.

FIG. 3 illustrates a block diagram of a millimeter wave modem assembly 300 that may be implemented as part of the outdoor signal conversion module 200 according to an exemplary embodiment. The millimeter wave modem assembly 300 may represent an exemplary embodiment of the modem assembly 204.

Additionally, in an exemplary embodiment, the modem assembly 300 may be a Broadcom Corporation BCM85100, which supports bit rates of up to approximately 9 Gbps. The Broadcom Corporation BCM85100 is provided for illustrative purposes only, and it is not intended to be the only modem assembly capable of being used herein, and is not meant to limit this disclosure. In particular, any modem assembly that meets the strict specifications described in this disclosure may be used. Additionally, as will become apparent to those skilled in the relevant art(s), the modem assembly 300 operates in a continuous mode without any interruption, which is mandatory for PtP links.

The modem assembly 300 includes an input/output (IO) interface module 302, which is configured to receive digital data streams 310.1, and transmit recovered digital data streams 310.2. The modem assembly 300 also includes an encoder module 304, which is electrically connected to the IO interface module 302. The encoder module 304 encodes the recovered digital data streams 310.2 to form coded digital bits 312. The encoder module 304 may represent an exemplary embodiment of a channel code encoder, which allows for the transmitted power to be utilized more efficiently in terms of the performance of the modem assembly 300. The encoder module 304 may also encode the coded digital bits 312 using a 8b/10b encoding scheme. In such an embodiment, the encoder module 304 encodes the coded digital bits 312 by mapping an 8-bit symbol to a 10-bit symbol. The encoder module 304 may also encode the coded digital bits 312 using a forward error correction (FEC) scheme, such as a low-density parity-check (LDPC) code to provide an example. Using a FEC scheme increases the probability that transmitted information will be successfully recovered (error free).

Additionally, the modem assembly 300 includes a physical layer (PHY) module 306 electrically connected to the encoder module 304. In an exemplary embodiment, the PHY module 306 may either convert the coded digital bits 312 into digital symbols and then into digital samples 314, or convert received digital samples 320 into received digital symbols and then into received coded digital bits 322. The PHY module 306 may also be capable of performing both of these conversions within a single module. Further, the modem assembly 300 may include a data conversion module 308, which is electrically connected to the PHY module 306. The data conversion module 308 performs a high rate DAC of the digital samples 314 to form an analog signal 316 suitable for transmission over the wCPRI link 114. In an exemplary embodiment, the data conversion module 308 may perform a high rate DAC of the digital symbols to form the analog signal 316 suitable for transmission over the wCPRI link 114. Additionally, the transmission power can be configured according to an Adaptive Code Modulation and Buad (ACMB) specification. Thus, the transmission power is configurable to have a constant peak, constant power, or any other such characteristic.

In an exemplary embodiment, the data conversion module 308 may perform a high rate ADC of a received analog signal 318 to form received digital samples 320. However, in this particular embodiment, the encoder module 304, or a portion thereof, is replaced with a decoder module (not pictured) that is configured to decode the received coded digital bits 322 to form received digital data streams 324.2. The IO interface module then transmits received recovered digital data streams 324.1 to either a connected base station module or RRH module.

As referred to throughout the disclosure, the term high rate conversion means a data conversion that takes place at such high bit rates that the converted data is capable of being transmitted across a link according to the CPRI specifications. The high rate ADC and DAC are integral to the invention because the ADC and DAC performances are the limiting factors for the maximum rates and modulation that can be achieved by the modem assembly 300. Accordingly, the data conversion module 308 is capable of performing the high rate ADC and DAC at up to approximately 9 Gbps; however, other data rates are possible without departing from the spirit and scope of the present disclosure. The data conversion module 308 is also capable of performing the high rate ADC and DAC at baud rates of approximately 125 MSym/Sec to approximately 1.7 Gsym/Sec, and at a bandwidth of approximately 2 GHz; however, other baud rates and/or bandwidths are possible without departing from the spirit and scope of the present disclosure. Further, the data conversion module 308 is capable of performing the high rate ADC and DAC at a high modulation order such as 128 QAM or 256 QAM to provide some examples; however, other modulation orders are possible without departing from the spirit and scope of the present disclosure.

In an exemplary embodiment, the modem assembly 300 also reduces the transmission delay over the wCPRI link 114 when compared to the delay over a conventional fiber optic cable. In such an exemplary embodiment, the BCM85100's maximum latency for transmission and receipt is shown below:

Maximum allowed cable length (CPRI): 10 Km

One side delay due to maximum cable length (speed of light in fiber optic cable is 200000 Km/Sec):

$$OpticDelay=10\ Km/200000\ [Km/Sec]=50\ uSec$$

Maximum mmWave link distance at 5 nines (due to physical limitation): 2.5 Km

Maximum mmWave link delay:

$$mmWaveDelay=2.5\ Km/300000\ [Km/Sec]=8.3\ uSec$$

Spare delay due to the mmWave shorter link:

$$SpareDelay=OpticDelay-mmWaveDelay=50\ uSec-8.3\ uSec=41.75\ uSec$$

Delay of other component in the AODU: AODU_SysDelay=2 uSec

BCM85100 PHY layer Maximum latency for Tx+Rx $$BRCM85100_{max\_delay\_Tx+Rx}=SpareDelay-AODU\_SysDelay=39.7\ uSec.$$

An Exemplary Method of Preparing Data to be Transmitted Over a Wireless Link

Figure 4:
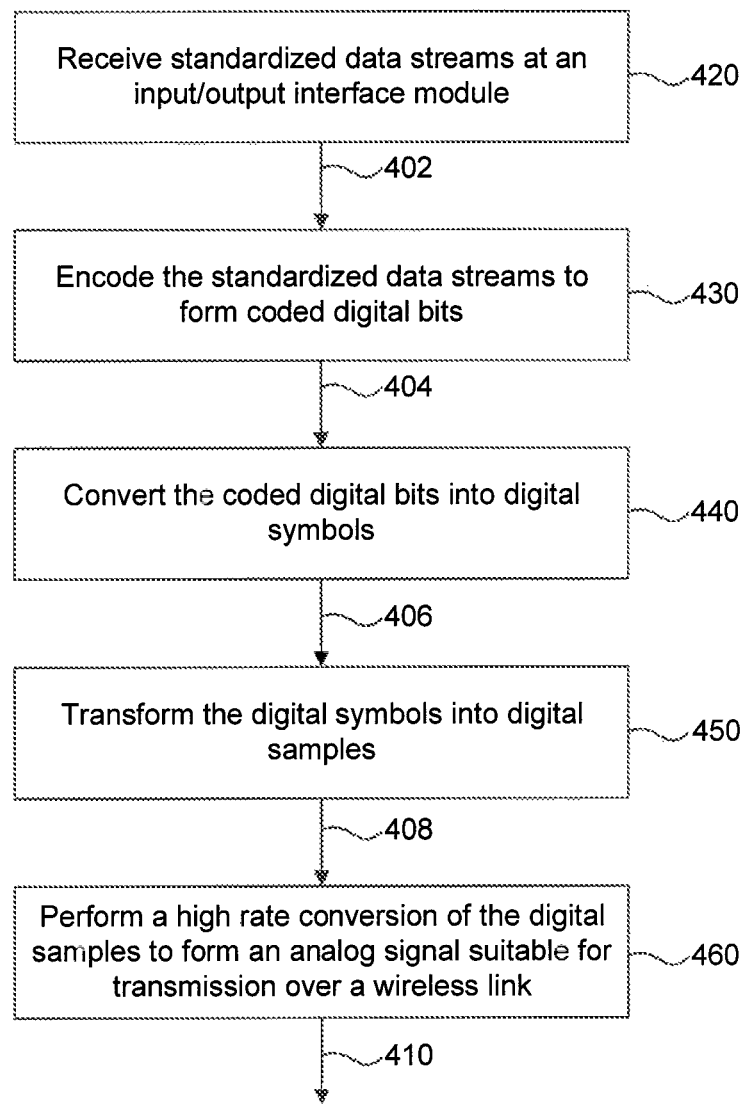
FIG. 4 is a flowchart of exemplary operational steps of preparing data to be transmitted over a wireless link according to an exemplary embodiment.

FIG. 4 is a flowchart of exemplary operational steps of preparing data to be transmitted over the wCPRI link 114 according to an exemplary embodiment. The disclosure is not limited to this operational description. Rather, it will be apparent to persons skilled in the relevant art(s) from the teachings herein that other operational control flows are within the scope and spirit of the present disclosure. The following discussion describes the steps in FIG. 4.

A method 400 begins at step 420, where the digital data streams 402 are received by the IO interface module 302. In an exemplary embodiment, the digital data streams 402 may include a combination of the digital bits, the management data 212 and the synchronous clock signal 220. Further, the digital data streams 402 are channels of data that have been framed according to the CPRI standard. The method then proceeds to step 430. In step 430, the digital data streams 402 are encoded to form coded digital bits 404. The digital data streams 402 may be encoded using an 8b/10b encoding scheme, a FEC scheme, or some other acceptable encoding scheme.

The method then proceeds to step 440. In step 440, the coded digital bits 404 are converted into digital symbols 406.

The method then proceeds to step 450. In step 450, the digital symbols 406 are transformed into digital samples 408. The method then proceeds to step 460. In step 460, a high rate DAC is performed on the digital samples 408 to form an analog signal 410, which is suitable for transmission over the wCPRI link 114.

In an exemplary embodiment, for the analog signal 410 to be suitable for transmission over the wCPRI link 114, the analog signal 410 must meet the CPRI specifications. The high rate DAC is integral to the invention because the DAC performance is a limiting factor for the maximum rate and modulation that can be achieved by the modem assembly 300. Therefore, the high rate DAC performed at step 460 must be capable of being performed at up to approximately 9 Gbps, at baud rates in the range of approximately 125 MSym/Sec to approximately 2 Gsym/Sec, at a bandwidth of approximately 1 GHz, and at a high modulation order (e.g. 128 QAM or 256 QAM).

Figure 5:
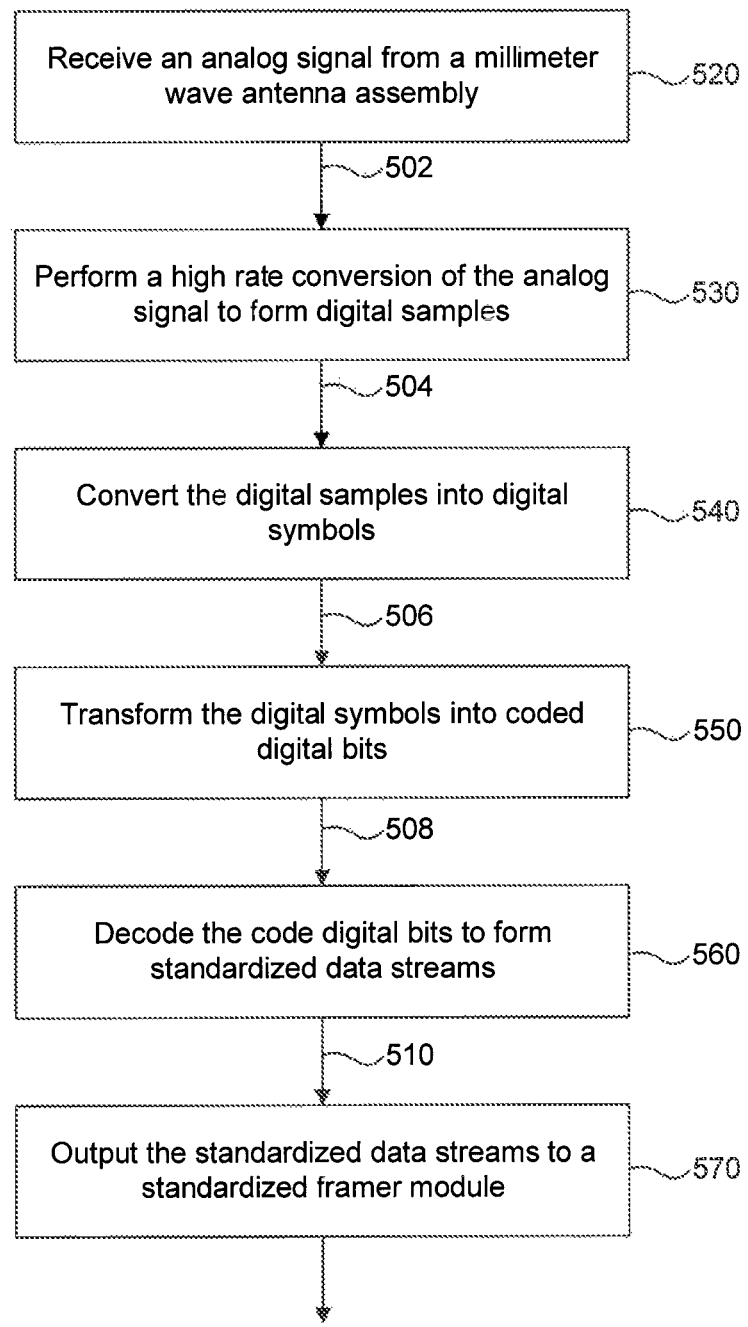
FIG. 5 is a flowchart of exemplary operational steps of preparing data to be transmitted, where the data was received over a wireless link according to an exemplary embodiment.

An Exemplary Method of Preparing Data to be Transmitted after being Received over a Wireless Link FIG. 5 is a flowchart of exemplary operational steps of preparing data to be transmitted, where the data was received over the wCPRI link 114 according to an exemplary embodiment. The disclosure is not limited to this operational description. Rather, it will be apparent to persons skilled in the relevant art(s) from the teachings herein that other operational control flows are within the scope and spirit of the present disclosure. The following discussion describes the steps in FIG. 5.

The method 500 begins at step 520, where an analog signal 502 is received from the millimeter wave antenna. The analog signal 502 may represent an exemplary embodiment of the analog signal 410. The method then proceeds to step 530. In step 530, a high rate ADC is performed on the analog signal 502 to form digital samples 504. The digital samples 504 may represent an exemplary embodiment of the digital samples 408. The method then proceeds to step 540. In step 540, the digital samples 504 are converted into digital symbols 506. The digital symbols 506 may represent an exemplary embodiment of the digital symbols 406. The method then proceeds to step 550. In step 550, the digital symbols 506 are transformed into coded digital bits 508. The coded digital bits 508 may represent an exemplary embodiment of the coded digital bits 404. The method then proceeds to step 560. In step 560, the coded digital bits 508 are decoded to form digital data streams 510. The coded digital bits 508 may be decoded using an appropriate decoding scheme, which may be dependent upon the type of encoding scheme used in step 430. In an exemplary embodiment, the coded digital bits 508 may be decoded using a FEC scheme, such as a configurable Reed Solomon decoder to provide an example.

In step 560, following the decoding of the coded digital bits 508, the digital data streams 510 are formed. In an exemplary embodiment, the digital data streams 510 may include a combination of the digital bits, the management data 212 and the synchronous clock signal 220. Further, the digital data streams 510 are channels of data that have been framed according to the CPRI standard. The digital data streams 510 may represent an exemplary embodiment of the digital data streams 402. The method then proceeds to step 570. In step 570, the digital data streams 510 are output to the framer module 210.

In an exemplary embodiment, following a transmission over the wCPRI link 114, for the analog signal 502 to be properly received and converted back into the digital data streams 510 that conform to the CPRI standard, the analog signal 502 must meet the CPRI specifications. The high rate ADC is integral to the invention because the ADC performances are limiting factors for the maximum rates and modulation that can be received by the modem assembly 300. Therefore, the high rate ADC performed at step 530 must be capable of being performed at up to approximately 9 Gbps, at baud rates in the range of approximately 125 MSym/Sec to approximately 2 Gsym/Sec, at a bandwidth of approximately 1 GHz, and at a high modulation order (e.g. 128 QAM or 256 QAM).

An Exemplary Wireless Communication Environment

Figure 6:
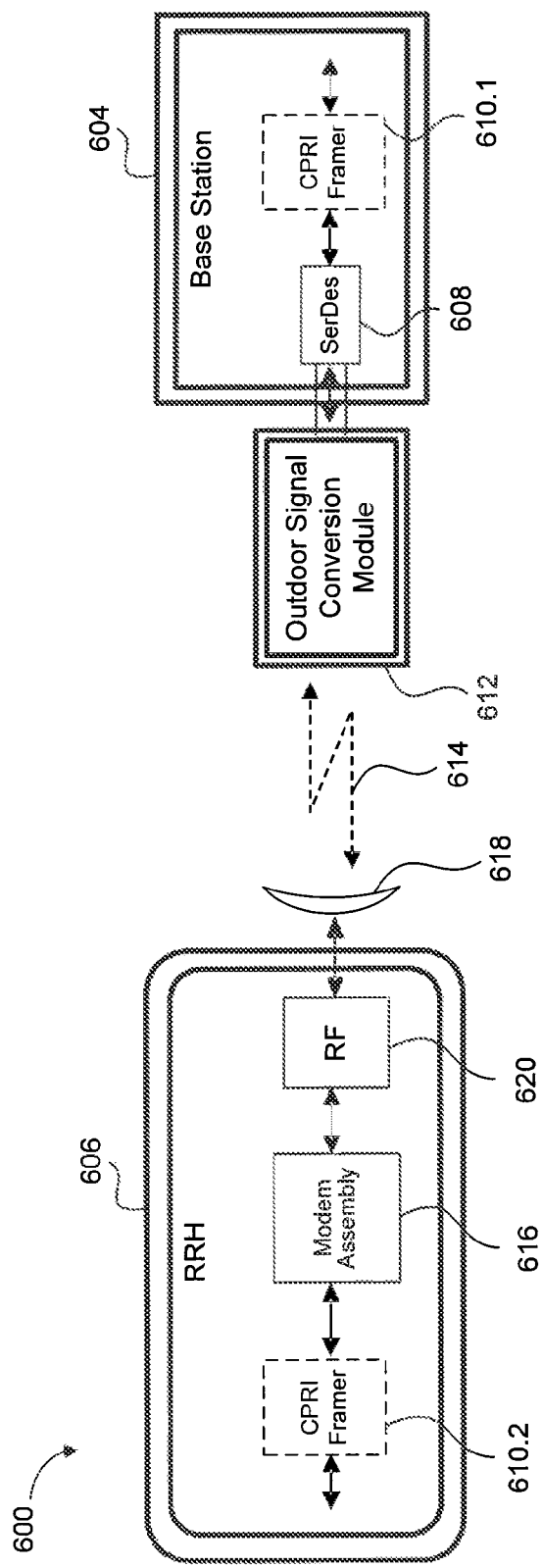
FIG. 6 illustrates a block diagram of a second wireless communication environment according to an exemplary embodiment.

FIG. 6 illustrates a block diagram of a second wireless communication environment according to an exemplary embodiment.

A wireless communication environment 600 provides wireless communication of information, such as one or more commands and/or data, between a first wireless communication device 604 and a second wireless communication device 606. The first wireless communication device 604 may represent an exemplary embodiment of a base station module. The first wireless communication device 604 may also represent an exemplary embodiment of the first wireless communication device 104. The second wireless communication device 606 may represent an exemplary embodiment of a RRH module.

The RRH module 606 may be connected to the base station module 604 over a wCPRI link 614. Although the present disclosure refers to a wireless CPRI link when discussing the type of wireless link used for communication between the base station module 604 and the RRH module 606, this is for illustrative purposes only. Those skilled in the relevant art(s), will recognize that wireless links that are governed by other standards, such as OBSAI, ETSI, ORI, or FCC, to provide some examples, may be used to wirelessly connect the base station module 604 to the RRH module 606. Also, the wCPRI link 614 may represent an exemplary embodiment of wCPRI link 114.

The base station module 604 may include a SerDes module 608 and a standardized framer module 610.1 coupled to the SerDes module 608. The RRH module 606 may also include a framer module 610.2. Further, the wireless communication environment 600 includes an outdoor signal conversion module 612 coupled to the base station module 604. The RRH module 606 also includes a modem assembly 616, which may be built into the RRH module 606. The modem assembly 616 may also represent an exemplary embodiment of the modem assembly 204. Additionally, a millimeter wave antenna 618 may be positioned substantial close to the RRH module 606.

In an exemplary embodiment where the modem assembly 616 is built into the RRH module 606, an RF functional module 620 may also be built into the RRH module 606.

The combination of the outdoor signal conversion module 612, the modem assembly 616, the RF functional module 620, and the antenna 618 provide wireless communication between the base station module 604 and the RRH module 606. In such an exemplary embodiment, the base station module 604 and RRH module 606 are capable of communicating over the wCPRI link 614, thus allowing the base station module 604 and RRH module 606 to communicate wirelessly while also meeting the high bit rate requirements defined by the CPRI specifications. Therefore, neither the base station module 604 nor the RRH module 606 according to this exemplary embodiment would be able to distinguish whether a transmission occurred over the wCPRI link 614 or over a conventional fiber optic cable.

An Exemplary Wireless Communication Device

Figure 7:
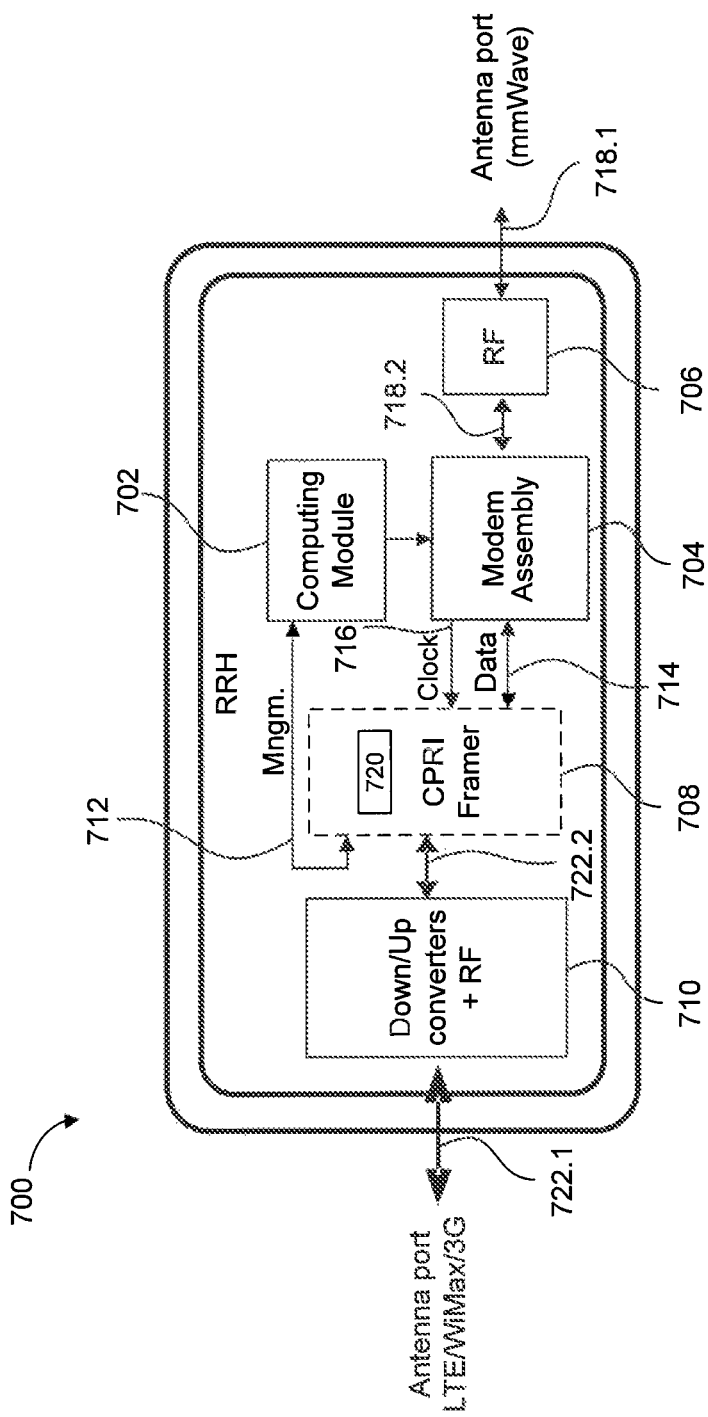
FIG. 7 illustrates a block diagram of a wireless communication device that may be implemented as part of a second wireless communication environment according to an exemplary embodiment.

FIG. 7 illustrates a block diagram of a wireless communication device that is implemented as part of the second wireless communication environment according to an exemplary embodiment.

A wireless communication device 700 may represent an exemplary embodiment of a RRH module. The wireless communication device 700 may also represent an exemplary embodiment of the second wireless communication device 606. The RRH module 700 includes a computing module 702 that follows the management data 712, and sends the management data 712 to any requestor. The RRH module 700 also includes a modem assembly 704 coupled to the computing module 702. The modem assembly 704 may represent an exemplary embodiment of the modem assembly 300. The modem assembly 704 performs a high rate ADC, and DSP functions, of an analog sequence 718.2 received over the wCPRI link 614 to convert the analog sequence 718.2 back into digital data streams 714 that conform to the CPRI standard. The RRH module 700 further includes an RF functional module 706 coupled to the modem assembly 704, which performs operations upon an analog signal 718.1. The RF functional module 706 performs a down-conversion of the analog signal 718.1 such that the modem assembly 704 can perform the high rate ADC of the analog sequence 718.2.

In an exemplary embodiment, the modem assembly 704 may be configured to operate as either a modem or as a SerDes. In such an exemplary embodiment, the modem assembly 704 includes both a modem and a SerDes. The modem assembly also includes a switching mechanism located at the output of the modem assembly, which switches between providing a connection to the modem and providing a connection to the SerDes. Further, in such an exemplary embodiment, the RRH module 700 includes an SFP coupled to the modem assembly 704. As described earlier in the disclosure, the SFP allows the SerDes positioned inside the modem assembly 704 to receive data over a fiber optic link. Therefore, in such an exemplary embodiment, the modem assembly 704 can receive data over the wCPRI link 614 or over the fiber optic link.

The RRH module 700 may also include a standardized framer module 708 coupled to both the computing module 702 and the modem assembly 704. The framer module 708 may also represent an exemplary embodiment of the framer module 210. The framer module 708 receives digital data streams 714 and frames the digital data streams 714 with the management data 712 in accordance with a high-level clock signal 720 to form standardized digital bits according to the CPRI specification. The high-level clock signal 720 may represent an exemplary embodiment of the high-level clock signal 214. Additionally, the RRH module 700 includes a second clock signal, a synchronous clock signal 716, which is output from the modem assembly 704 and functions as an oscillator to synchronize the base station module 604 and the RRH module 700. In an exemplary embodiment, the synchronous clock signal 716 may be transmitted via a dedicated port (not shown in FIG. 7). The synchronous clock signal 716 may be based on precision time protocol (PTP), defined in the IEEE 1588-2008 (1588v2) standard, or the Synchronous Ethernet (SyncE) protocol. However, any clock/networking protocol that is capable of synchronizing a transmitter and receiver over a wireless link may be used without departing from the spirit and scope of the present disclosure. The RRH module 700 also includes a converter module 710 coupled to the framer module 708.

The RRH module 700 performs a variety of functions on the incoming analog signal 718.1 to convert the analog signal 718.1 into a RF data signal 722.1 that conforms to one of the mobile standards, such as LTE, WiMax, or 3G to provide some examples. Accordingly, upon receipt of the incoming analog signal 718.1 from the antenna 618, where the analog signal 718.1 has been received over the wCPRI link 614, the antenna 618 sends the analog signal 718.1 to the RF functional module 706. The RF functional module 706 then performs a down-conversion of the analog signal 718.1 such that the modem assembly 704 can perform a high rate ADC of the analog sequence 718.2. The modem assembly 704 then performs the high rate ADC as well as DSP functions on the analog sequence 718.2 to convert the analog sequence 718.2 into the digital data streams 714. The digital data streams 714 are input into the framer module 708. The framer module 708 then frames the digital data streams 714 to put the digital data streams 714 in the CPRI standard. The framer module 708 outputs the management data 712 back into the computing module 702, which in turn inputs the management data 712 back into the modem assembly 704. The framer module 708 also outputs a digital data sequence 722.2 to the converter module 710 for further DSP processing.

The converter module 710, which consists of analog and digital components, receives the digital data sequence 722.2 from the framer module 708, and then either up-converts or down-converts the digital data sequence 722.2. The converter module 710 may also combine multiple digital data sequences 722.2 to form a single RF signal, or the converter module 710 may split the digital data sequence 722.2 into multiple RF signals. Whether the converter module 710 up-converts or down-converts the digital data sequence 722.2 is dependent on whether the RRH module 700 receives the analog signal 718.1 or transmits the RF data signal 722.1.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A millimeter wave modem assembly configured to be positioned between a base station and a remote radio head unit, comprising:

an input/output interface configured to receive and transmit a plurality of standardized data streams in accordance with dedicated interface specifications;

an encoder configured to encode the plurality of standardized data streams to form a plurality of coded digital bits;
a physical layer configured to:
  convert the plurality of coded digital bits into digital symbols and into digital samples, and
  convert the digital samples into the digital symbols and into the plurality of coded digital bits; and
a data conversion module configured to perform a high rate conversion of the digital samples to form an analog signal suitable for transmission over a wireless link between the base station and the remote radio head unit in accordance with the dedicated interface specifications.

2. The millimeter wave modem assembly of claim 1, wherein the data conversion module is configured to perform the high rate data conversion at up to approximately 9 gigabits per second, at baud rates of approximately 125 MSym/Sec to approximately 1.7 Gsym/Sec, at a bandwidth of approximately 2 GHz, and at a high modulation order.

3. The millimeter wave modem assembly of claim 2, wherein the encoder is a channel code encoder.

4. The millimeter wave modem assembly of claim 3, wherein the plurality of coded digital bits are encoded using a forward error correction scheme.

5. The millimeter wave modem assembly of claim 1, wherein the plurality of standardized data streams include a combination of digital bits, management data and a high-level clock signal.

6. The millimeter wave modem assembly of claim 5, wherein the plurality of standardized data streams are channels of data that have been framed according to common public radio interface (CPRI) specifications.

7. The millimeter wave modem assembly of claim 5, wherein the plurality of standardized data streams are channels of data that have been framed according to open base station architecture initiative (OBSAI) specifications.

8. The millimeter wave modem assembly of claim 1, wherein the input/output interface is configured to receive and transmit the plurality of standardized data streams in accordance with common public radio interface (CPRI) specifications, and wherein the data conversion module is also configured to perform the high rate data conversion in accordance with the common public radio interface (CPRI) specifications.

9. The millimeter wave modem assembly of claim 1, wherein the data conversion module is configured to perform the high rate data conversion of the analog signal to form the digital samples, and wherein at least a portion of the encoder is configured to decode the plurality of coded digital bits to form the plurality of standardized data streams.

10. The millimeter wave modem assembly of claim 1, wherein the input/output interface is configured to receive and transmit the plurality of standardized data streams in accordance with open base station architecture initiative (OBSAI) specifications, and wherein the data conversion module is also configured to perform the high rate data conversion in accordance with the OBSAI specifications.

11. The millimeter wave modem assembly of claim 1, wherein the input/output interface is configured to receive and transmit the plurality of standardized data streams in accordance with a European Telecommunications Standards Institute (ETSI) standard, and wherein the data conversion module is also configured to perform the high rate data conversion in accordance with the ETSI standard.

12. A method of preparing data to be transmitted over a wireless link, comprising:

receiving a plurality of standardized data streams from a base station, in accordance with dedicated interface specifications, at an input/output interface;
encoding the plurality of standardized data streams to form a plurality of coded digital bits;
converting the plurality of coded digital bits into digital symbols;
transforming the digital symbols into digital samples, and performing a high rate conversion of the digital samples to form an analog signal suitable for transmission between the base station and a remote radio head over the wireless link in accordance with the dedicated interface specifications.

13. The method of claim 12, wherein the high rate conversion is capable of being performed at up to approximately 9 gigabits per second, at baud rates in the range of approximately 125 MSym/Sec to approximately 1.7 Gsym/Sec, at a bandwidth of approximately 2 GHz, and at a high modulation order.

14. The method of claim 12, wherein the plurality of coded digital bits are encoded using a forward error correction scheme.

15. The method of claim 12, wherein the plurality of standardized data streams include a combination of digital bits, management data and a high-level clock signal.

16. The method of claim 15, wherein the plurality of standardized data streams are channels of data that have been framed according to common public radio interface (CPRI) specifications.

17. The method of claim 15, wherein the plurality of standardized data streams are channels of data that have been framed according to open base station architecture initiative (OBSAI) specifications.

18. The method of claim 12, further comprising preparing the analog signal to be further transmitted, where the analog signal has been received over the wireless link.

19. The method of claim 18, further comprising:
receiving the analog signal from a millimeter wave antenna assembly;
performing a second high rate conversion of the analog signal, in accordance with the dedicated interface specifications to form recovered digital samples;
converting the recovered digital samples into recovered digital symbols;
transforming the recovered digital symbols into a plurality of recovered coded digital bits;
decoding the plurality of recovered coded digital bits to form a plurality of recovered standardized data streams; and
outputting the plurality of recovered standardized data streams to a standardized framer.

20. The method of claim 19, wherein the input/output interface receives and transmits the plurality of standardized data streams in accordance with common public radio interface (CPRI) specifications, and wherein the high rate conversion is performed in accordance with the common public radio interface (CPRI) specifications.

21. The method of claim 19, wherein the input/output interface receives and transmits the plurality of standardized data streams in accordance with open base station architecture initiative (OBSAI) specifications, and wherein the high rate conversion is performed in accordance with the OBSAI specifications.

22. The method of claim 19, wherein the input/output interface receives and transmits the plurality of standardized data streams in accordance with a European Telecommunications Standards Institute (ETSI) standard, and wherein the high rate conversion is performed in accordance with the ETSI standard.

23. A multi-functional millimeter wave modem assembly configured to be positioned between a base station and a remote radio head unit, comprising;
- a modem configured to receive and transmit a plurality of standardized data streams in accordance with dedicated interface specifications, to modulate/demodulate the received plurality of data streams, and to perform a high rate conversion of the received plurality of data streams to form an analog signal suitable for transmission over a wireless link between the base station and the remote radio head in accordance with the dedicated interface specifications;
- a serial/deserializer configured to convert the received plurality of data streams between serial and parallel interfaces; and
- a switching mechanism configured to switch between the modem and the serial/deserializer.

24. The multi-functional millimeter wave modem assembly of claim 23, further comprising a small form factor pluggable transceiver configured to enable the serial/deserializer to receive the plurality of standardized data streams over the wireless link.

25. The multi-functional millimeter wave modem assembly of claim 23, further comprising a small form factor pluggable transceiver configured to enable the serial/deserializer to receive the plurality of standardized data streams over a fiber optic link.

26. The multi-functional millimeter wave modem assembly of claim 23, wherein the plurality of standardized data streams are capable of being received and transmitted over both the wireless link and a fiber optic link.

* * * * *

UNITED STATES PATENT AND TRADEMARK OFFICE
CERTIFICATE OF CORRECTION

| | | |
|---|---|---|
| PATENT NO. | : 8,837,564 B2 | Page 1 of 1 |
| APPLICATION NO. | : 13/341690 | |
| DATED | : September 16, 2014 | |
| INVENTOR(S) | : Ridel et al. | |

It is certified that error appears in the above-identified patent and that said Letters Patent is hereby corrected as shown below:

In the Claims

Column 12, line 63-64, please replace "radio head unit," with --radio head,--.

Column 13, line 11, please replace "radio head unit" with --radio head--.

Column 13, line 17, please replace "MSym/See" with --MSym/Sec--.

Column 15, line 6, please replace "comprising;" with --comprising:--.

Signed and Sealed this
Seventeenth Day of February, 2015

Michelle K. Lee
*Deputy Director of the United States Patent and Trademark Office*